United States Patent
Besselmann et al.

(10) Patent No.: US 10,075,088 B2
(45) Date of Patent: Sep. 11, 2018

(54) CONTROLLING A LOAD COMMUTATED CONVERTER DURING UNDERVOLTAGE

(71) Applicant: ABB Schweiz AG, Baden (CH)

(72) Inventors: Thomas Besselmann, Birmenstorf (CH); Stefan Almer, Zürich (CH); Jan Wiik, Oslo (NO); Sture Van de Moortel, Trimbach (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/618,475

(22) Filed: Jun. 9, 2017

(65) Prior Publication Data
US 2017/0279365 A1 Sep. 28, 2017

Related U.S. Application Data

(63) Continuation of application No. PCT/EP2015/077380, filed on Nov. 23, 2015.

(30) Foreign Application Priority Data

Dec. 9, 2014 (EP) ..................................... 14196928

(51) Int. Cl.
*H02M 5/451* (2006.01)
*H02M 1/00* (2006.01)

(52) U.S. Cl.
CPC .... *H02M 5/451* (2013.01); *H02M 2001/0003* (2013.01)

(58) Field of Classification Search
CPC ......... H02M 5/451; H02M 2001/0003; H02M 5/44; H02M 5/443; H02M 5/45
See application file for complete search history.

(56) References Cited

U.S. PATENT DOCUMENTS 4,237,531 A 12/1980 Cutler et al.
4,420,719 A 12/1983 D'Atre et al.
(Continued)

FOREIGN PATENT DOCUMENTS

GB 2034940 A 6/1980

OTHER PUBLICATIONS

European Patent Office, International Search Report and Written Opinion issued in corresponding Application No. PCT/EP2015/077380, dated Feb. 15, 2016, 11 pp.
(Continued)

*Primary Examiner* — Kyle J Moody
(74) *Attorney, Agent, or Firm* — J. Bruce Schelkopf; Taft Stettinius & Hollister LLP

(57) ABSTRACT

A load commutated converter interconnects an AC power grid with an AC load and comprises a grid-side converter, a DC link and a load-side converter. A method for controlling the load commutated converter comprises: determining a gridside firing angle for the grid-side converter; determining a load-side firing angle for the load-side converter; determining a grid voltage of the AC power grid; modifying the grid-side firing angle and/or the load-side firing angle based on the grid voltage, such that when an undervoltage condition in the AC power grid occurs, the operation of the load commutated converter is adapted to a change in the grid voltage; and applying the grid-side firing angle to the grid-side converter and the load-side firing angle to the load-side converter.

20 Claims, 2 Drawing Sheets

(56) References Cited

U.S. PATENT DOCUMENTS

| | | | |
|---|---|---|---|
| 4,469,999 A * | 9/1984 | Swenson | H02M 5/4505 |
| | | | 318/798 |
| 4,475,150 A | 10/1984 | D'Atre et al. | |
| 2014/0268926 A1* | 9/2014 | Gupta | H02M 5/44 |
| | | | 363/35 |

OTHER PUBLICATIONS

European Patent Office, International Preliminary Report on Patentability issued in corresponding Application No. PCT/EP2015/077380, dated Nov. 24, 2016, 6 pp.

European Patent Office, Extended Search Report issued in corresponding Application No. 14196928.7, dated Jun. 17, 2015, 5 pp.

* cited by examiner ary AC power of varying frequency, or vice versa. The AC power of fixed frequency is provided by an electric grid, while the AC power of varying frequency is used to supply loads, such as electrical AC machines such as asynchronous machines, synchronous machines or doubly-fed machines.
CONTROLLING A LOAD COMMUTATED CONVERTER DURING UNDERVOLTAGE

FIELD OF THE INVENTION

The invention relates to a method, a computer program, a computer-readable medium and a controller for controlling a load commutated converter. Furthermore, the invention relates to a load commutated converter.

BACKGROUND OF THE INVENTION

Medium voltage converters are typically employed to transform AC power of fixed frequency into AC power of varying frequency, or vice versa. The AC power of fixed frequency is provided by an electric grid, while the AC power of varying frequency is used to supply loads, such as electrical AC machines such as asynchronous machines, synchronous machines or doubly-fed machines.

In most configurations, the frequency transformation is carried out in a two-step approach: First, the AC power of fixed frequency is rectified to DC power and subsequently the DC power is inverted into AC power of the desired frequency. In the power generation mode, the power flow is reversed and the varying-frequency AC power of the load is rectified to DC power and subsequently inverted into fixed-frequency AC power of the grid.

One type of medium voltage converter is a load commutated converter, also referred to as line commutated inverter, solid-state frequency converter or static frequency converter. While being a mature technology, load commutated converters are a good choice in high power applications, due to their high efficiency, simplicity, proven reliability and wide speed and power range.

Load commutated converters are employed by various industries such as the mining, the metals or the oil and gas industries. Load commutated converters are often employed at remote places, where the grid conditions may be far from ideal. Long cables to the power generation may result in a weak grid, i.e. the grid voltage may have a relatively high dependence on the grid current. Weather conditions, line interruptions and the consumption pattern of other large power consumers in the vicinity of a load commutated converter may result in brownouts, in the following also referred to as undervoltage condition, grid voltage sags, voltage dips or temporary power losses.

Processes which are powered by a load commutated converter may be quite sensitive to a loss of drive torque. For example, load commutated converters are used to drive assets in oil and gas industry such as gas pipeline compressors. A voltage dip may lead to tripping all compressors of a plant which is especially bad as the process needs to be stopped completely and then restarted.

There exists a number of approaches to tackle grid undervoltage conditions. U.S. Pat. No. 4,475,150 describes as protection measure against grid undervoltage, where the firing of the line side converter is inhibited during undervoltage conditions. In U.S. Pat. No. 4,642,546, the normal firing is inhibited until the DC link current has decayed. U.S. Pat. No. 4,272,816 describes a hardware implementation of procedure for interrupting the power line in case of a detected overcurrent. In U.S. Pat. No. 4,427,934, a torque reference limiter (which consequently limits the current reference) is described, which becomes active for high stator flux magnitudes. In U.S. Pat. No. 4,237,531, a protection system against overvoltage at the machine-side converter semiconductors is described, which inhibits the firing of the machine-side converter and adapts the firing of the line-side converter.

U.S. Pat. No. 4,420,719 discloses a method for controlling a load commutated converter, which interconnects an AC power grid with a motor. More concrete, U.S. Pat. No. 4,420,719 uses a threshold in the DC current to change the behaviour of the system.

GB 2 034 940 A shows a control of induction heating and melting furnaces using load commutated converters and the operating methods thereto.

DESCRIPTION OF THE INVENTION

In general, in one approach of dealing with undervoltage condition in the grid, the normal operation of the load commutated converter may be continued in the case of an undervoltage condition. If the AC or DC currents are too large at the return of the nominal grid voltage, the drive may be tripped to prevent electrical damage.

With this approach, only small deviations from the nominal grid voltage may be accommodated. Larger deviations usually result in a depletion of the DC link inductance, because the machine-side converter drains more energy than can be provided by the line-side converter under the prevalent grid conditions. Overcurrent trips at the return of the grid voltage are also possible.

According to a second approach, if the grid voltage magnitude falls under a certain threshold (for example 80% of a nominal grid voltage), a trip may be activated stopping the operation of the converter. Such a threshold may be combined with a time condition, i.e. the grid voltage magnitude has to fall below the threshold for a certain time span. Tripping the drive may be not necessary, but may be a measure of precaution to avoid difficult operating conditions including the inrush current at the end of the voltage dip.

Furthermore, according to a third approach, if the grid voltage magnitude falls under a certain threshold, the grid-side converter and/or load-side converter may be temporarily stopped from firing their thyristors. After the grid voltage has returned, the converters may be started operating again and the DC link current and thus the drive torque may be slowly ramped up.

With this approach the load commutated converter may be prevented from tripping, but to the cost of providing no drive torque during the undervoltage condition. In order to avoid drive shaft oscillations, the torque ramps after the undervoltage condition are usually rather slow such that the process is not provided with the requested drive torque for a longer time.

It is an objective of the invention to maintain the operation of a load commutated converter and the connected load during an undervoltage condition. It is a further objective of the invention to increase the resilience of a load commutated converter against tripping during an undervoltage condition.

These objectives are achieved by the subject-matter of the independent claims. Further exemplary embodiments are evident from the dependent claims and the following description.

An aspect of the invention relates to a method for controlling a load commutated converter. A load commutated converter may comprise a DC link with an inductance. Furthermore, a load commutated converter may be a current controlled converter. In particular, the load commutated converter may be a medium voltage converter, adapted for commutating voltages above 1.000 V.

In general, a load commutated converter may interconnect an AC power grid with an AC load and/or may comprise a grid-side converter, a DC link and a load-side converter. The load may be an electrical motor or another power grid.

The DC link may comprise one or more inductors. It may be possible that the DC link comprises a long cable, i.e. that the grid-side converter and the load-side converter are remote from each other and/or may be separated by at least 1 km or more.

According to an embodiment of the invention, the method comprises: determining a grid-side firing angle for the grid-side converter, for example based on a DC link current of the DC link; determining a load-side firing angle for the load side converter, for example based on the DC link current; determining a grid voltage of the AC power grid; modifying the grid-side firing angle and/or the load-side firing angle based on the grid voltage, such that when an undervoltage condition in the AC power grid occurs, the operation of the load commutated converter is adapted to a change in the grid voltage; and applying the grid-side firing angle to the grid-side converter and the load-side firing angle to the load-side converter.

The method may be performed by a controller of the load commutated converter. The controller may determine an unmodified grid-side and load-side firing angle and may modify at least one of these firing angles, when an undervoltage is detected.

A firing angle may indicate at which time instant a phase of the grid or of the load may be interconnected with the DC link via the grid-side or load-side converter. The firing angle may be the angle after a zero crossing of the respective phase, when the phase is interconnected with the DC link.

Undervoltage in the AC grid or an undervoltage condition (also called voltage dip or brownout) may be defined by a voltage that is lower than a nominal voltage in the grid. The exact grid voltage necessary to sustain a requested drive torque (i.e. a threshold for undervoltage) may depend on the operating point of the load, for example on a rotational speed, a DC link current, and/or on a requested torque itself. Hence, a constant (fixed) grid voltage threshold may lead to suboptimal results.

The modification of the grid-side and/or load-side firing angle may be based on the magnitude or amplitude of the grid voltage. It also may be possible that the modification is based on the maximal voltage of one or more phases of the grid voltage and/or of the form of the curves of one or more phase voltages.

The characteristics of an undervoltage condition may be very different in view of its duration, its depths, the fall and rise times of the grid voltage, and the number of phases which are affected. The method may not be limited to a specific form of undervoltage, but may maintain operation of the load commutated converter under various forms of undervoltage.

In the case, the grid voltage, which, for example, may be measured by the controller, indicates that there is an undervoltage present, the controller may determine alternative values for the grid-side and/or load-side firing angle, in order to maintain operation during an undervoltage condition and/or to avoid overcurrent during change back to a normal voltage condition. The load commutated inverter may continue its operation in the case of an undervoltage.

In the end, the firing angles are applied to the converter, i.e. the controller determines time instants and switching patterns for the thyristors of the grid-side and load-side converter and generates corresponding gate signals for switching the thyristors.

With the method, in the case of a minor undervoltage, the load commutated converter may continue its operation to provide the requested drive torque. In the case of a more severe undervoltage, the load commutated converter may provide as much drive torque as is sustainable under the prevalent grid conditions.

According to an embodiment of the invention, the grid-side firing angle is modified such that during a change from the undervoltage condition back to a normal voltage condition in the AC power grid, the DC link current stays below an upper bound. The operation of the load commutated converter may be disturbed in the case of a return of the grid voltage after or at the end of an undervoltage condition. Changes of the grid voltage can excite filter banks on the grid-side of the load commutated converter, resulting in oscillating voltage transients and voltage overshoots. With the method, the return of the grid voltage may be handled without high inrush currents.

When the grid-side voltage returns after an undervoltage condition, there may be a risk of an overcurrent in the DC link. The reason is that there may be a delay inherent in the switching (i.e. there is an actuator delay) which limits the speed of the controllers reaction. The actuator delay may not be constant, but may depend on the (unmodified) grid-side firing angle (the control input). Changing the firing angles of the thyristor bridges does not result in immediate changes of DC side voltage and AC side current, since the thyristor bridges possess an asymmetric angle-dependent switching delay.

Thyristors can be switched on at any time, but cannot be switched off at any time. In order to switch off a thyristor, the current flowing through the thyristor usually has to be reduced to zero. This usually is done by applying a negative voltage over the thyristor. In the grid-side (and also load-side) converter, a decrease of the firing angle can thus happen immediately by firing the thyristors, while an increase of the firing angle is achieved by waiting with the firing until the AC side phase-to-phase voltages have reduced accordingly.

According to an embodiment of the invention, a lower bound for the grid-side firing angle is determined based on the grid voltage, and the grid-side firing angle is changed to the lower bound, when the unmodified grid-side firing angle is below the lower bound.

In other words, the controller may define a lower bound on the line-side firing angle and may ensure that the line-side converter firing angle stays above this lower bound. The lower bound may depend on the fact that thyristors only may be switched off, when the voltage applied to them is zero, which depends on the actual phase of the grid-side voltage.

Furthermore, the controller may compute the lower bound as a function of the grid voltage.

According to an embodiment of the invention, the lower bound for the grid-side firing angle is determined based on a difference between the DC link current and a maximal current for the DC link and/or the lower bound for the grid-side firing angle is determined based on an inductance of the DC link. As will be shown below, the cosine of the grid-side firing angle depends on the product of this difference with the inductance.

According to an embodiment of the invention, the lower bound for the grid-side firing angle is determined based on a switching delay, after which the next switching of the grid-side converter is possible. As described above, the switching delay is based on the fact that a thyristor usually cannot be fired, when the voltage between its anode and cathode has the correct sign and/or that the thyristor turns off, when the current between its anode and cathode is zero.

According to an embodiment of the invention, an unmodified grid-side firing angle, which is modified to the grid-side firing angle to be applied to the grid-side converter, is determined based on a grid-side DC link voltage which is determined from a current reference and/or torque reference. The unmodified switching angle is the switching angle that would be determined by the controller without the measures of the method as described herein.

According to an embodiment of the invention, the grid-side firing angle and/or the load-side firing angle is determined based on a difference between the DC link current and a current reference. The current reference may be provided by a speed control layer, which determines the current reference based on a speed set point and a speed reference of an electrical motor/electrical machine supplied by the load commutated converter.

According to an embodiment of the invention, the current reference is modified based on the grid voltage such that a power consume of the load is adapted to the power provided by the grid during the undervoltage. The controller may have a current limiter that reduces the DC current, whenever an undervoltage condition is detected. In such a way, the power consumed by the load may be reduced such that the load may remain operable even during an undervoltage condition.

According to an embodiment of the invention, the current reference is determined based on a reference torque for the load and the torque reference is modified based on the grid voltage such that a power consume of the load is adapted to the power provided by the grid during the undervoltage. Analogously to the current limiter, the controller may have a torque limiter that reduces the torque reference such that the load may remain operable even during an undervoltage condition. The torque reference may be reduced if the requested torque is not sustainable under the undervoltage condition.

By adapting the current reference and/or torque reference based on the voltage magnitude of the power grid, the line-side and/or machine-side firing angles may be modified indirectly. The firing angles are adapted to a reduced power consumption of the load.

When the power from the grid is restricted, the maximum torque delivered by the machine may also be restricted. Assuming an ideal voltage source, constant power outtake from the grid may be kept during an undervoltage condition by increasing the current. However, the DC link current cannot be arbitrarily large. Therefore, also the current and/or torque reference may be adjusted. Adjusting the current and/or torque reference may also help to avoid windup in the current controller, and the occurrence of limit cycles with oscillating torques being delivered to the load.

According to an embodiment of the invention, an upper bound for the current reference and/or the torque reference is determined based on the grid voltage, and the current reference and/or torque reference is changed to the upper bound, when an unmodified current reference and/or unmodified torque reference is above the upper bound. The restriction of the current and/or torque reference for restricting the consumed power may be implemented with an upper bound that is applied, whenever the corresponding values become higher than this bound. The controller may compute the upper bound on the torque and/or current reference, and may ensure that the torque and/or current reference stays below this upper bound.

According to an embodiment of the invention, the upper bound for the current reference and/or the torque reference is determined based on a lower bound of the grid-side firing angle. Since the power on the grid-side (voltage magnitude times DC current times firing angle) and the load-side (speed times torque) has to be equal, the grid-side firing angle may be related to the torque (or the current respectively). In the case the upper bound for the torque and/or reference currents fulfills this condition with respect to the lower bound for the firing angle, the power consumed by the load is lesser or equal to the power supplied to the DC link. Thus, the controller may compute this upper bound as a function of the grid voltage.

According to an embodiment of the invention, the load-side firing angle is modified (for example reduced) such that during the undervoltage condition, a load-side DC link voltage is adapted to a grid-side DC link voltage. In the case of an undervoltage condition, the electric power offered by the grid is reduced, but not necessarily zero. Adapting the grid-side firing angle of the grid-side converter alone might not be sufficient to sustain a DC link current and thus the requested, or even a reduced, torque. Adapting the load-side firing angle may help to reduce the power consumed by load, which for example, may be seen from a differential equation governing the dynamics of the DC link inductance. The machine-side firing angle may be reduced to ensure that the DC voltage of the load-side converter is not larger than the grid-side DC voltage supplied by the grid-side converter. The controller may change the load-side firing angle in case the grid-side converter firing angle saturates (i.e. reaches the lower bound).

According to an embodiment of the invention, the load-side firing angle is modified based on a function of the modified grid side firing angle. Under the condition that the voltage on both sides of the DC link should be equal, the grid-side firing angle may be related to the load-side firing angle.

According to an embodiment of the invention, an unmodified load-side firing angle, which is modified to the load side firing angle to be applied to the load-side converter, is determined based on a lookup-table.

A further aspect of the invention relates to a computer program for controlling a load commutated converter, which, when being executed by a processor, is adapted to carry out the steps of the method as described above and in the following as well as to a computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a controller adapted for controlling a load commutated converter, which is adapted for performing the method as described above and in the following. It has to be understood that such a controller may comprise a processor, which is adapted for performing at least some of the steps of the method. For example, the modification of the grid-side firing angle, the load-side firing angle and/or the modification of the torque and/or current reference may be performed by software routines, whereas other steps of the method, such as, for example, a speed control layer for providing a torque and/or current reference may be implemented in hardware.

A further aspect of the invention relates to a load commutated converter, which comprises a grid-side converter for converting a grid-side AC current from an electrical power grid into a DC current, a load-side converter for converting the DC current into a load-side AC current to be supplied to a load, a DC link interconnecting the grid-side converter and the load-side converter comprising at least one inductance, and a controller as described in the above and in the following. The grid-side and/or load side converters may comprise one or more half-bridges, which comprise semiconductor switches such as thyristors, which switching is controlled by the respective firing angles.

It has to be understood that features of the method as described in the above and in the following may be features of the computer program, the computer-readable medium, the controller and the load commutated converter, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
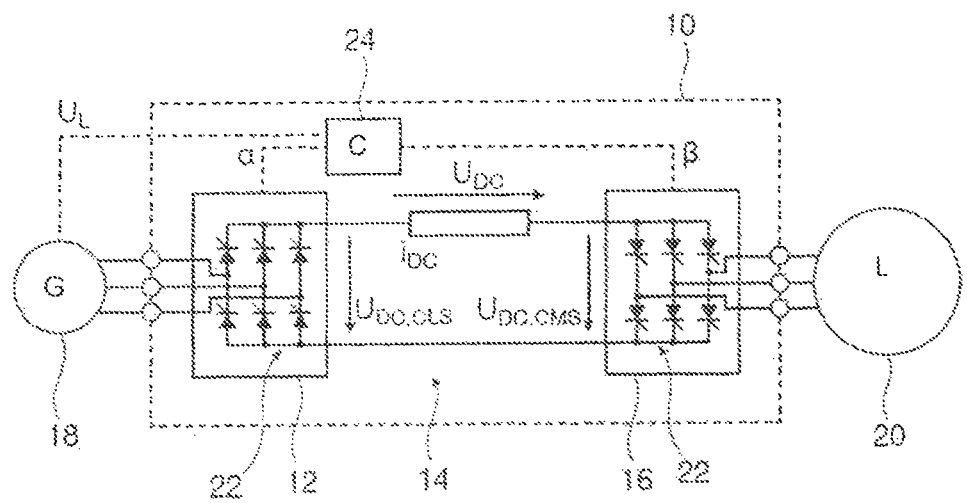
FIG. 1 schematically shows a load commutated converter according to an embodiment of the invention.

FIG. 1 shows a load commutated converter 10, which comprises a grid-side converter 12, an inductive DC link 14 and a load-side converter 16. Furthermore, FIG. 1 shows an AC grid (G) 18 and an AC load (L) 20, for example a synchronous machine, which are interconnected by the load commutated converters 10.

The grid-side converter 12 and the load-side converter 14 typically comprise a number of 6-pulse thyristor converter bridges 22. On one side, the line-side converter 12 may be connected to the three-phase AC grid 18 by means of a transformer and/or a number of filters to mitigate grid current harmonics. On the other side, the line-side converter 12 is electrically connected to the DC link 14, which again is electrically connected to the load-side converter 16. The load-side converter 16, and thus the load commutated converters 10, is connected to the AC load 20.

The grid-side converter 12 may be referred to as rectifier, while the load-side converter 16 may be referred to as inverter. However, this naming convention ignores that the power flow may also be inverted, such that the line-side converter 12 operates as an inverter, and the load-side converter 16 as a rectifier.

The depicted topology is only one possible variant. In particular, the connections between the described elements do vary. For instance, instead of a single three-phase connection, dual three-phase or multiple three-phase (polyphase) connections may be used. The grid-side converter 12 and the machine-side converter 16 may comprise multiple 6-pulse thyristor bridges. The DC link 14 may be connected as a two-port network, or in other configurations. Also parallel configurations are possible, where each entity comprises its own grid-side converter 12, DC link 14 and load-side converter 16.

Furthermore, the connection between the load commutated converter 10 and the grid 18 may comprise a transformer, circuit breakers, isolators and/or different filters. The connection between the load commutated converter 10 and the load 20 may comprise one or more filters, transformers and/or circuit breakers. Both connections may be long cables, which may induce additional dynamics to the system.

The load commutated converter 10 comprises a controller (C) 24, which is adapted for performing a method for controlling the converter 10 during undervoltage conditions.

Figure 2:
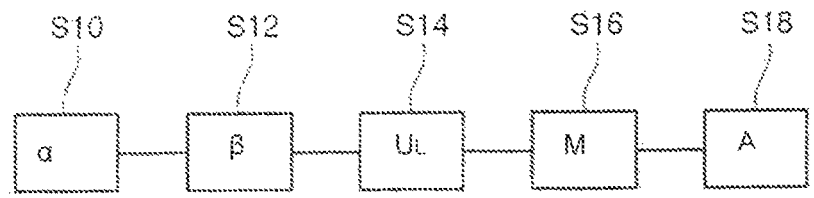
FIG. 2 shows a flow diagram for a method for controlling a load commutated converter according to an embodiment of the invention.

FIG. 2 shows a flow diagram for such a method. Details of the method will be explained with respect to FIGS. 3 to 6.

In step S10, the controller 24 determines a grid-side firing angle ($\alpha$) for the grid-side converter 10 based on a DC link current $i_{DC}$ of the DC link 14 (and possible based on further quantities).

In step S12, the controller 24 determines a load-side firing angle ($\beta$) for the load-side converter 16, also based on the DC link current $i_{DC}$ (and possible based on further quantities).

In step S14, the controller 24 determines a grid voltage magnitude ($U_L$) of the AC power grid 18. For example, the grid voltage magnitude $U_L$ may be measured in the connection between the grid 18 and the converter 10.

In step S16, the controller 24 modifies (M) the grid-side firing angle $\alpha$ and/or the load-side firing angle $\beta$ based on the grid voltage magnitude $U_L$, such that when an undervoltage condition in the AC power grid 18 occurs, the operation of the load commutated converter 10 is adapted to a change in the grid voltage magnitude $U_L$.

In step S18, the controller 24 applies (A) the grid-side firing angle $\alpha$ to the grid-side converter 12 and the load-side firing angle $\beta$ to the load-side converter 16. Here, the controller 24 determines corresponding gate signals for the thyristors of the thyristor bridges 22.

Figure 3:
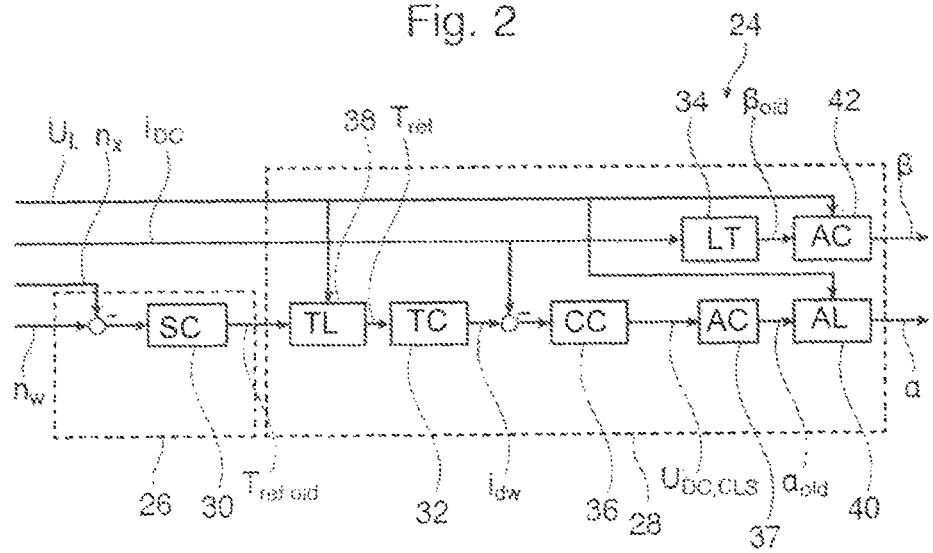
FIG. 3 schematically shows a controller for controlling a load commutated converter according to an embodiment of the invention.

FIG. 3 shows components of the controller 24, which comprises a speed control layer (or outer loop) 26 and a current control layer (or inner loop) 28.

The speed control layer 26 comprises a speed controller (SC) 30 (typically a PI controller), which, depending on a speed setpoint $n_w$ and a speed estimate $n_x$, generates a DC link current reference $i_{dw}$ or a torque reference $T_{ref}$.

Furthermore, layer 26 may comprise an anti-windup controller for compensating actuator saturation. The anti-windup controller may be in situations, where the inner control loop 28 is not able to provide torque demanded by the outer control loop 26 via the torque reference $T_{ref}$.

In the case, the DC link current reference $i_{dw}$ is not directly generated, a torque controller (TC) 32 determines the DC link current reference $i_{dw}$ from the torque reference $T_{ref}$.

The DC link current $i_{DC}$ is an approximate, yet measurable measure of the drive torque and may be measured directly in the DC link 14. In the inner current control layer, the actual DC link current $i_{DC}$ is compared to the reference $i_{dw}$, and the grid-side firing angle α is adapted accordingly. The output of the current controller (CC) 36 (typically a PI controller) is the DC side voltage $U_{DC,CLS}$ of the grid-side converter 12, which is proportional to cos α.

Using an average model of the grid-side converter (12)

$$U_{DC,CLS} \approx kU_L \cos \alpha, \qquad (1)$$

where $U_L$ is the grid voltage magnitude or amplitude and k is a constant, the grid-side firing angle can be computed as $$\alpha = \arccos(U_{DC,CLS}/(kU_L)). \qquad (2)$$

As indicated in FIG. 3, from the voltage $U_{DC,CLS}$ an unmodified firing angle $\alpha_{old}$ for the grid-side converter 12 is determined with a grid-side angle controller (AC) 37.

The unmodified load-side firing angle $\beta_{old}$ is given from a lookup table (LT) 34 based on the DC link current $i_{DC}$. The lookup table 34 is configured to ensure reliable operation of the load-side converter 16 and close to unity power factor in the stator windings, depending on the state of the load 20.

Both grid-side and load-side switching instances of the thyristors are determined from the firing angles α, β by a modulator.

During steady state, this simplifies the control and gives the highest drive efficiency due to low reactive power consumption of the load 20, such as a synchronous machine. However, during an undervoltage condition, the machine side inductor voltage is not reduced enough to maintain the DC link current $i_{DC}$ and thus the drive torque.

Furthermore, the controller may comprise an excitation control loop for a synchronous machine 20. In a typical setup for control of synchronous machines, the excitation control loop is an additional control loop.

For handling undervoltage conditions, the controller 24 additionally comprises a torque limiter (TL) 38, an angle limiter (AL) 40 and an angle controller (AC) 42.

Note that the controller 24 does not need to comprise all three subcontrollers 38, 40, 42 (which may be implemented as software routines). However, undervoltage conditions may be handled more efficiently by a combination of two or all three subcontrollers 38, 40, 42.

Lower Bound for the Grid-Side Firing Angle α

Figure 4:
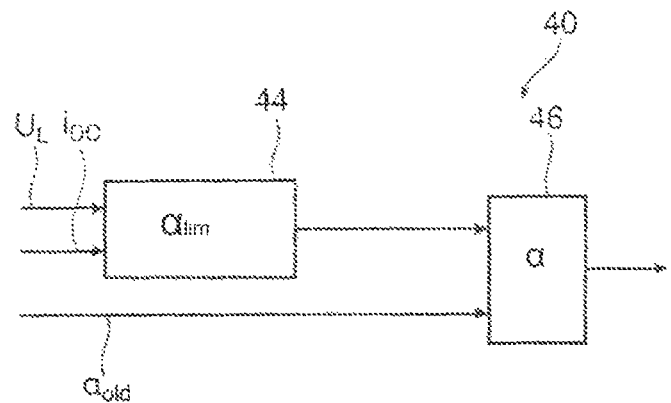
FIG. 4 schematically shows aspects of the controller of FIG. 3.

With respect to FIG. 4, a method (for example implemented by a software routine) for adapting the grid-side firing angle α in case of an undervoltage condition is described. When the line side voltage returns after an undervoltage condition, there may be a risk of an overcurrent in the DC link 14. The reason is that there is a delay inherent in the switching (i.e. there is an actuator delay) which limits the speed of the reaction of the controller 24. The actuator delay may not be constant, but may depend on the firing angle α (control input). The method may deal with the delay by limiting the value of the grid-side firing angle α.

In this situation, it may be assumed that the line voltage magnitude $U_L$ has dropped to a level $U_L<1$ and that the control system has stabilized and is applying grid-side converter and machine-side converter firing angles $\alpha^0$, $\beta^0$, respectively, and the DC link current is $i_{DC}{}^0$. It may be furthermore assumed that at time $t_0$ the voltage amplitude returns instantaneously to the nominal value with a step $\Delta U_L := 1 - U_L$. If the control of the grid-side converter firing angle has a delay of $T_d$, the DC link current will grow according to $$d/dt\, \Delta i_{DC} = \Delta U_L \cos(\alpha^0)/L_{DC}, t \text{ in } [t_0, t_0+T_d], \qquad (3)$$

where $\Delta i_{DC}$ is the deviation from the steady state $i_{DC}{}^0$. Thus, when the controller 24 can react (at time $t_0+T_d$), the DC link current is at the value $i_{DC} = i_{DC}{}^0 + T_d \Delta U_L \cos(\alpha^0)/L_{DC}$. In order not to violate the current limit $i_{DC,lim}$, we impose therefore the limit $$\cos(\alpha^0) \leq (i_{DC,lim} - i_{DC}{}^0)L_{DC}/(\Delta U_L T_d)$$

$$\Leftrightarrow \alpha^0 \geq \arccos((i_{DC,lim} - i_{DC}{}^0)L_{DC}/(\Delta U_L T_d)). \qquad (4)$$

As mentioned above, the value of the delay $T_d$ is time varying. In the proposed embodiment we consider the worst case which is a switching delay of 60°. With a line frequency of 50 Hz, this corresponds to $0.02 * \frac{1}{6} \approx 3$ ms.

Note that the presented limit on the grid-side converter firing angle α is conservative. Other bounds on, or adaptations of the grid-side firing angle α based on the grid voltage $U_L$ are possible.

The undervoltage adaptation of the grid-side firing angle α can thus be stated as $$\alpha_{lim} = \arccos((i_{DC,lim} - i_{DC})L_{DC}/\Delta U_L T_d)), \qquad (5)$$

$$\alpha = \max(\alpha_{old}, \alpha_{lim}) \qquad (6)$$

with $\alpha_{lim}$ being the limit on the firing angle stemming from the observation above, $\alpha_{old}$ being the unmodified firing angle, and α being the adapted firing angle.

As indicated in FIG. 4, which shows components of the subcontroller 40, in block 44, the limit on the firing angle ($\alpha_{lim}$) is computed from the grid voltage magnitude $U_L$ and the DC link current $i_{DC}$ using Equation (5). In block 46, this limit is compared to the unmodified grid-side converter firing angle $\alpha_{old}$ selected by the controllers 36, 37, and is possibly adapted to the new grid-side firing angle (α).

Adaptation of the Torque Reference $T_{ref}$

When the line voltage drops, we adapt the lower limit of the grid-side firing angle α as described above. When the firing angle α is restricted, this also restricts the power which can be taken from the grid 18 and thus the maximum torque which a load 20 can deliver. Assuming an ideal voltage source, constant power outtake can be kept during an undervoltage condition by increasing the current. However, the DC link current $i_{DC}$ cannot be arbitrarily large. Therefore, the torque reference $T_{ref}$ may be adjusted whenever the firing angle α is adjusted. Adjusting the torque reference $T_{ref}$ may help to avoid windup in the controller, and the occurrence of limit cycles with oscillating torques being delivered to a synchronous machine.

The adjustment of the torque may be based on a power balance consideration. The power on the grid side and on the load side must be equal, $$k\, U_L \cos(\alpha) i_{DC} = \omega_r T_{ref}, \qquad (7)$$

where k is a constant, $T_{ref}$ is the torque reference and $\omega_r$ is the rotor speed. If the firing angle limit is such that $kU_L \cos(\alpha_{min}) i_{DC,lim} \geq \omega_r T_{ref}$ (where $\alpha_{min}$ is the lower bound on the grid-side converter firing angle and $i_{DC,lim}$ is the upper limit on the current), we lower the torque reference in order to be able to satisfy the power balance with a DC current satisfying the upper limit. We apply the following algorithm to the torque reference, $$T_{ref,lim} = (k\, U_L \cos(\alpha_{min}) i_{DC,lim})/\omega_r. \qquad (8)$$

$$T_{ref} = \min(T_{ref,old}, T_{ref,lim}). \qquad (9)$$

Here, the limit on the torque reference is denoted by $T_{ref,lim}$, the unmodified torque reference is denoted by $T_{ref,old}$ and the modified torque reference is denoted as $T_{ref}$.

Figure 5:
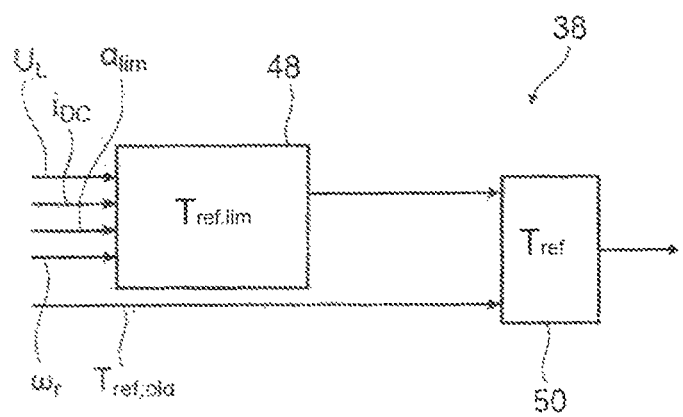
FIG. 5 schematically shows aspects of the controller of FIG. 3.

As indicated in FIG. 5, which shows components of the subcontroller 40, in block 48, an upper bound ($T_{ref,lim}$) on the torque reference is computed from the grid voltage magnitude $U_L$, the upper limit on the DC link current $i_{DC}$, the lower limit on the grid-side converter firing angle $\alpha_{lim}$ and the rotor speed $\omega_r$, using Equation (8). This bound is then compared to the torque reference $T_{ref,old}$ from the speed PI controller in block 50 and the smaller value is taken as modified torque reference ($T_{ref}$).

Analogously, the DC link current reference $i_{dw}$ or equivalent quantities may be modified.

Adaptation of the Load-Side Firing Angle β

Figure 6:
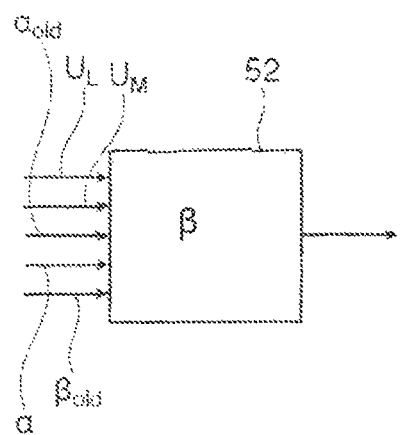
FIG. 6 schematically shows aspects of the controller of FIG. 3.

Finally, a third method is described with respect to FIG. 6, which adapts the load-side firing angle β in case the grid-side firing angle α saturates.

Instead of choosing a constant value $\beta_{old}$ for the load-side firing angle from a lookup table 34, feedback control may be implemented. For instance, the load-side firing angle β may be controlled to be decreased as a function of the grid voltage $U_L$, or as a function of deviation between current reference $i_{dw}$ and actual current $i_{DC}$.

With reference to FIG. 1, a DC link voltage $U_{DC}$ is applied over the DC link inductance. This DC link voltage $U_{DC}$ is the difference of the DC side voltage of the grid-side converter $U_{DC,CLS}$ and the DC side voltage of the load-side converter $U_{DC,CMS}$.

When the current PI controller demands a DC side voltage $U_{DC,CLS,ref}$ higher than what is feasible—be it due to an undervoltage condition or due to the subsequently imposed lower bound on the grid-side converter firing angle α—the method may reduce the DC side voltage of the load-side converter $U_{DC,CMS}$ accordingly, to keep the voltage applied over the DC link inductance unaffected by the saturation. Thus, the PI controller continues to control the DC link current $i_{DC}$, yet by means of the load-side converter 16. Reducing the DC side voltage $U_{DC,CMS}$ of the load-side converter 16 may reduce the power supplied to a load 20. However, this reduction of the consumed power ensures that the DC link current $i_{DC}$ does not vanish as would happen if the DC side voltage of the machine-side converter $U_{DC,CMS}$ is kept constant. Since the DC link current $i_{DC}$ may be essential to generate drive torque, the method may ensure that the drive is able to deliver at least some of the requested torque during undervoltage conditions.

The adapted DC side voltage of the machine-side converter $U_{DC,CMS,new}$ can be computed from the difference between the requested and the actual (saturated) voltage on the grid-side converter side, $$u_{DC,CMS,new} = u_{DC,CMS,old} - (u_{DC,CLS,ref} - u_{DC,CLS,act}). \quad (10)$$

Inserting the average models for the voltages of the grid-side converter 12 and the load-side converter 16, $$u_{DC,CLS} \approx kU_L \cos\alpha, u_{DC,CMS} \approx -kU_M \cos\beta \quad (11)$$

yields the update formula for the load-side converter firing angle $$\beta = \arccos(\cos\beta_{old} + U_L \cos\alpha_{old}/U_M - U_L \cos\alpha/U_M). \quad (12)$$

The unmodified load-side firing angle from the lookup table 34 is denoted by $\beta_{old}$, and the modified firing angle is denoted by β. As above, we also have the grid-side firing angle $\alpha_{old}$ from the current PI controller, and the modified grid-side firing angle α.

As indicated in FIG. 6, which shows components of the subcontroller 40, in block 52, the adapted load-side firing angle (β) is computed from the grid voltage magnitude $U_L$, the machine (load) voltage magnitude $U_M$, the grid-side converter angle $\alpha_{old}$ requested by the current PI controller, the modified grid-side firing angle α and the modified load-side firing angle $\beta_{old}$ from the lookup table 34.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 load commutated converter
12 grid-side converter
14 DC link
16 load-side converter
18 power grid
20 load
22 thyristor converter bridge
24 controller
α grid-side firing angle
β load-side firing angle
$i_{DC}$ DC link current
$U_L$ grid voltage magnitude
$U_{DC}$ DC link voltage
$U_{DC,CLS}$ DC side voltage of the grid-side converter
$U_{DC,CMS}$ DC side voltage of the load-side converter
26 speed control layer
28 current control layer
30 speed controller
32 torque controller
34 lookup table
36 current controller
37 grid-side angle controller
38 torque limiter
40 grid side angle limiter
42 load-side angle controller
$\alpha_{old}$ unmodified grid-side firing angle
$\beta_{old}$ unmodified load-side firing angle
$n_w$ speed setpoint
$n_x$ speed estimate
$T_{ref}$ torque reference
$i_{dw}$ DC link current reference
$\alpha_{lim}$ lower bound for grid-side firing angle
$T_{ref,old}$ unmodified torque reference
$T_{ref,lim}$ upper bound for torque reference
44 controller component
46 controller component
48 controller component
50 controller component
52 controller component
$U_M$ machine voltage magnitude

The invention claimed is:
1. A method for controlling a load commutated converter, which interconnects an AC power grid with an AC load, the load commutated converter comprising a grid-side converter, a DC link and a load-side converter, the method comprising:
   determining a grid-side firing angle ($\alpha$) for the grid-side converter;
   determining a load-side firing angle ($\beta$) for the load-side converter;
   determining a grid voltage ($U_L$) of the AC power grid;
   modifying the grid-side firing angle ($\alpha$) and/or the load-side firing angle ($\beta$) based on the grid voltage ($U_L$), such that when an undervoltage condition in the AC power grid occurs, the operation of the load commutated converter is adapted to a change in the grid voltage ($U_L$);
   applying the grid-side firing angle ($\alpha$) to the grid-side converter and the load-side firing angle ($\beta$) to the load-side converter.

2. The method of claim 1,
   wherein the grid-side firing angle ($\alpha$) is modified such that during a change from the undervoltage condition back to a normal condition in the AC power grid, the DC link current ($i_{DC}$) stays below an upper bound.

3. The method of claim 2,
   wherein a lower bound ($\alpha_{lim}$) for the grid-side firing angle ($\alpha$) is determined based on the grid voltage ($U_L$), and the grid-side firing angle ($\alpha$) is changed to the lower bound ($\alpha_{lim}$), when the grid-side firing angle ($\alpha$) is below the lower bound ($\alpha_{lim}$).

4. The method of claim 3,
   wherein the lower bound ($\alpha_{lim}$) for the grid-side firing angle ($\alpha$) is determined based on a difference between a DC link current ($i_{DC}$) and a maximal current for the DC link; and/or
   wherein the lower bound ($\alpha_{lim}$) for the grid-side firing angle ($\alpha$) is determined based on a switching delay, after which a next switching of the grid-side converter is possible.

5. The method of claim 4,
   wherein an unmodified grid-side firing angle ($\alpha_{old}$), which is modified to the grid-side firing angle ($\alpha$) to be applied to the grid-side converter, is determined based on a grid-side DC link voltage ($U_{DC,CLS}$) which is determined from a current reference ($i_{dw}$) and/or torque reference ($T_w$).

6. The method of claim 5,
   wherein the grid-side firing angle ($\alpha$) and/or the load-side firing angle ($\beta$) is determined based on a difference between the DC link current ($i_{DC}$) and a current reference ($i_{dw}$);
   wherein the current reference ($i_{dw}$) is modified based on the grid voltage ($U_L$) such that a power consume of the load is adapted to the power provided by the power grid during the undervoltage condition; and/or
   wherein the current reference ($i_{dw}$) is determined based on a reference torque ($T_w$) for the load and the torque reference ($T_w$) is modified based on the grid voltage ($U_L$) such that a power consume of the load is adapted to the power provided by the power grid during the undervoltage condition.

7. The method of claim 6,
   wherein an upper bound for the current reference ($i_{dw}$) and/or the torque reference ($T_w$) is determined based on the grid voltage ($U_L$), and the current reference ($i_{dw}$) and/or torque reference ($T_w$) is changed to the upper bound, when the current reference ($i_{dw}$) and/or torque reference ($T_w$) is above the upper bound;
   wherein the upper bound for the current reference ($i_{dw}$) and/or torque reference ($T_w$) is determined based on a lower bound of the grid-side firing angle ($\alpha$);
   wherein the load-side firing angle ($\beta$) is modified such that during the undervoltage condition, a load-side DC link voltage is adapted to a grid-side DC link voltage ($U_{DC,CLS}$);
   wherein the load-side firing angle ($\beta$) is modified based on a function of the modified grid side firing angle ($\alpha$);
   wherein an unmodified load-side firing angle ($\beta_{old}$), which is modified to the load side firing angle ($\beta$) to be applied to the load-side converter, is determined based on a look-up table.

8. The method of claim 1,
   wherein a lower bound ($\alpha_{lim}$) for the grid-side firing angle ($\alpha$) is determined based on the grid voltage ($U_L$), and the grid-side firing angle ($\alpha$) is changed to the lower bound ($\alpha_{lim}$), when the grid-side firing angle ($\alpha$) is below the lower bound ($\alpha_{lim}$).

9. The method of claim 8,
   wherein the lower bound ($\alpha_{lim}$) for the grid-side firing angle ($\alpha$) is determined based on a difference between a DC link current ($i_{DC}$) and a maximal current for the DC link; and/or
   wherein the lower bound ($\alpha_{lim}$) for the grid-side firing angle ($\alpha$) is determined based on an inductance of the DC link; and/or
   wherein the lower bound ($\alpha_{lim}$) for the grid-side firing angle ($\alpha$) is determined based on a switching delay, after which a next switching of the grid-side converter is possible.

10. The method of claim 1,
    wherein an unmodified grid-side firing angle ($\alpha_{old}$), which is modified to the grid-side firing angle ($\alpha$) to be applied to the grid-side converter, is determined based on a grid-side DC link voltage ($U_{DC,CLS}$) which is determined from a current reference ($i_{dw}$) and/or torque reference ($T_w$).

11. The method of claim 1,
    wherein the grid-side firing angle ($\alpha$) and/or the load-side firing angle ($\beta$) is determined based on a difference between the DC link current ($i_{DC}$) and a current reference ($i_{dw}$);
    wherein the current reference ($i_{dw}$) is modified based on the grid voltage ($U_L$) such that a power consume of the load is adapted to the power provided by the power grid during the undervoltage condition; and/or
    wherein the current reference ($i_{dw}$) is determined based on a reference torque ($T_w$) for the load and the torque reference ($T_w$) is modified based on the grid voltage ($U_L$) such that a power consume of the load is adapted to the power provided by the power grid during the undervoltage condition.

12. The method of claim 11,
    wherein an upper bound for the current reference ($i_{dw}$) and/or the torque reference ($T_w$) is determined based on the grid voltage ($U_L$), and the current reference ($i_{dw}$) and/or torque reference ($T_w$) is changed to the upper bound, when the current reference ($i_{dw}$) and/or torque reference ($T_w$) is above the upper bound.

13. The method of claim 12,
    wherein the upper bound for the current reference ($i_{dw}$) and/or torque reference ($T_w$) is determined based on a lower bound of the grid-side firing angle ($\alpha$).

14. The method of claim 1,
wherein the load-side firing angle (β) is modified such that during the undervoltage condition, a load-side DC link voltage is adapted to a grid-side DC link voltage ($U_{DC,CLS}$).

15. The method of claim 1,
wherein the load-side firing angle (β) is modified based on a function of the modified grid side firing angle (α).

16. The method of claim 1,
wherein an unmodified load-side firing angle ($β_{old}$), which is modified to the load side firing angle (β) to be applied to the load-side converter, is determined based on a look-up table.

17. A computer program for controlling a load commutated converter, which interconnects an AC power grid with an AC load, the load commutated converter comprising a grid-side converter, a DC link and a load-side converter, the computer program when being executed by a processor, is adapted to carry out the following
determine a grid-side firing angle (α) for the grid-side converter;
determine a load-side firing angle (β);
determine a grid voltage ($U_L$) of the AC power grid;
modify the grid-side firing angle (α) and/or the load-side firing angle (β) based on the grid voltage ($U_L$), such that when an undervoltage condition in the AC power grid occurs, the operation of the load commutated converter is adapted to a change in the grid voltage ($U_L$);
apply the grid-side firing angle (α) to the grid-side converter and the load-side firing angle (β) to the load-side converter.

18. A non-transitory computer-readable medium, in which a computer program according to claim 17 is stored.

19. A controller adapted for controlling a load commutated converter, which interconnects an AC power grid with an AC load, the load commutated converter comprising a grid-side converter, a DC link and a load-side converter, the controller structured to:
determine a grid-side firing angle (α) for the grid-side converter;
determine a load-side firing angle (β) for the load-side converter;
determine a grid voltage ($U_L$) of the AC power grid;
modify the grid-side firing angle (α) and/or the load-side firing angle (β) based on the grid voltage ($U_L$), such that when an undervoltage condition in the AC power grid occurs, the operation of the load commutated converter is adapted to a change in the grid voltage ($U_L$);
apply the grid-side firing angle (α) to the grid-side converter and the load-side firing angle (β) to the load-side converter.

20. A load commutated converter, comprising:
the grid-side converter for converting a grid-side AC current from an electrical power grid into a DC current ($i_{DC}$);
the load-side converter for converting the DC current ($i_{DC}$) into a load-side AC current to be supplied to a load;
a DC link interconnecting the grid-side converter and the loadside converter comprising at least one inductance;
the controller according to claim 19 for controlling the grid-side converter and the load-side converter.

* * * * *